United States Patent
Iwata (10) Patent No.: US 10,024,230 B2
(45) Date of Patent: Jul. 17, 2018

(54) ENGINE SYSTEM AND CONTROLLER, CONTROL SYSTEM AND CONTROL METHOD FOR ENGINE SYSTEM

(71) Applicant: TOYOTA JIDOSHA KABUSHIKI KAISHA, Toyota-shi, Aichi-ken (JP)

(72) Inventor: Akitoshi Iwata, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 154 days.

(21) Appl. No.: 15/107,615

(22) PCT Filed: Dec. 4, 2014

(86) PCT No.: PCT/IB2014/002639
§ 371 (c)(1),
(2) Date: Jun. 23, 2016

(87) PCT Pub. No.: WO2015/097506
PCT Pub. Date: Jul. 2, 2015

(65) Prior Publication Data
US 2016/0319732 A1    Nov. 3, 2016

(30) Foreign Application Priority Data

Dec. 24, 2013 (JP) ................................. 2013-265692

(51) Int. Cl.
*F02B 29/04* (2006.01)
*F02B 33/44* (2006.01)
(Continued)

(52) U.S. Cl.
CPC ......... *F02B 39/005* (2013.01); *F01M 13/022* (2013.01); *F01M 13/028* (2013.01);
(Continued)

(58) Field of Classification Search
CPC ...... F02B 39/005; F02M 26/06; F02M 26/23; F01M 13/022; F01M 13/028;
(Continued)

(56) References Cited

U.S. PATENT DOCUMENTS 2,866,617 A * 12/1958 Land ...................... F01D 25/14
                                                      415/205
4,608,827 A *  9/1986 Hasegawa ............. F02B 39/005
                                                      123/41.31
(Continued)

FOREIGN PATENT DOCUMENTS

JP    2009-270474 A    11/2009
JP    2012-102617 A     5/2012

*Primary Examiner* — Thai Ba Trieu
(74) *Attorney, Agent, or Firm* — Oliff PLC (57) ABSTRACT

A controller for an engine system includes an exhaust-driven turbocharger including a compressor and a turbine, an exhaust gas recirculation unit configured to recirculate exhaust gas from a downstream portion of the turbine in an exhaust gas passage to an upstream portion of the compressor in an intake gas passage, and a cooling unit configured to cool the turbine, the controller includes an electronic control unit. The electronic control unit is configured to set a degree of cooling of the turbine based on a predetermined condition in which a gas temperature at an outlet portion of the compressor is higher than a predetermined temperature and the recirculating of exhaust gas is performed, and set a higher degree of cooling of the turbine when the predetermined condition is satisfied compared to a degree of cooling of the turbine when the predetermined condition is not satisfied.

5 Claims, 4 Drawing Sheets (51) Int. Cl.
*F02M 25/07* (2006.01)
*F02B 39/00* (2006.01)
*F02M 26/06* (2016.01)
*F02M 26/23* (2016.01)
*F02D 41/00* (2006.01)
*F01M 13/02* (2006.01)

(52) U.S. Cl.
CPC ........... *F02D 41/005* (2013.01); *F02M 26/06* (2016.02); *F02M 26/23* (2016.02); *F01M 2013/026* (2013.01); *F01M 2013/027* (2013.01); *F01P 2060/12* (2013.01)

(58) Field of Classification Search
CPC ........ F01M 2013/026; F01M 2013/027; F02D 41/005; F01P 2060/12
USPC .............. 60/599, 605.2–605.3; 123/572–574
See application file for complete search history.

(56) References Cited

U.S. PATENT DOCUMENTS

| | | | | |
|---|---|---|---|---|
| 6,513,328 | B2* | 2/2003 | Baeuerle | F02B 39/005 60/599 |
| 7,712,456 | B2* | 5/2010 | Hirano | F01M 13/021 123/572 |
| 8,365,526 | B2* | 2/2013 | Stiermann | F02B 39/005 60/599 |
| 8,695,339 | B2* | 4/2014 | Spix | F01M 13/028 123/572 |
| 8,833,073 | B2* | 9/2014 | Kuhlbach | F01P 7/165 60/599 |
| 9,441,534 | B2* | 9/2016 | Wu | F02B 39/005 |
| 2011/0180026 | A1* | 7/2011 | Heusler | F02B 39/005 123/41.44 |
| 2012/0103283 | A1* | 5/2012 | Mehring | F01P 3/02 123/41.02 |
| 2014/0116399 | A1* | 5/2014 | Ulrey | F02M 25/08 123/520 |
| 2015/0167494 | A1* | 6/2015 | Sumi | F02B 39/005 415/178 |
| 2015/0176429 | A1* | 6/2015 | Oki | F02B 39/005 415/175 |
| 2015/0219002 | A1* | 8/2015 | Hayase | F02B 39/005 60/605.3 |
| 2015/0292354 | A1* | 10/2015 | Asano | F02B 39/005 60/605.1 |
| 2015/0300202 | A1* | 10/2015 | Maeda | F02B 39/005 415/180 |
| 2015/0308310 | A1* | 10/2015 | Pursifull | F02D 41/003 123/572 |
| 2016/0076432 | A1* | 3/2016 | Kindl | F02B 39/005 60/605.1 |

* cited by examiner

ENGINE SYSTEM AND CONTROLLER, CONTROL SYSTEM AND CONTROL METHOD FOR ENGINE SYSTEM

BACKGROUND OF THE INVENTION

1. Field of the Invention

The present invention relates to a controller, a control system and a control method for an engine system.

2. Description of Related Art

An internal combustion engine mounted on a vehicle or the like is known which includes a turbocharger and an exhaust gas recirculation (EGR) unit. The turbocharger includes a compressor disposed in an intake gas passage and a turbine disposed in an exhaust gas passage. The turbocharger performs supercharging using energy of exhaust gas. The EGR unit includes an EGR passage through which the exhaust gas passage and the intake gas passage communicate with each other. The EGR unit recirculates a part of the exhaust gas in the intake gas. As described in Japanese Patent Application Publication No. 2012-102617 (JP 2012-102617 A), an internal combustion engine is known in which the intake gas passage side of the EGR passage is connected to an upstream portion of the compressor in the intake gas passage.

SUMMARY OF THE INVENTION

In the internal combustion engine including the EGR unit, high-temperature exhaust gas (EGR gas) is returned to the upstream portion of the compressor in the intake gas passage. Accordingly, unlike in a unit returning EGR gas to the downstream portion of the compressor in the intake gas passage, the gas temperature in the compressor is likely to rise and deposition of deposits, which are produced by exposure of an oil component and the like included in the EGR gas to a high temperature, on the compressor easily occurs. The deposition of deposits may cause a decrease in compressibility of intake air by the compressor and a decrease in supercharging efficiency of the turbocharger.

The invention provides a controller, a control system and a control method for an engine system that can suppress deposition of deposits in a compressor.

According to a first aspect of the invention, a controller for an engine system that includes an exhaust-driven turbocharger including a compressor and a turbine, the compressor disposed in an intake gas passage of an internal combustion engine and the turbine disposed in an exhaust gas passage of the internal combustion engine, an exhaust gas recirculation unit configured to recirculate exhaust gas from a downstream portion of the turbine in the exhaust gas passage to an upstream portion of the compressor in the intake gas passage, and a cooling unit configured to cool the turbine by circulating a coolant in a coolant passage disposed in the turbine, the controller includes an electronic control unit. The electronic control unit is configured to set a degree of cooling of the turbine by the cooling unit based on a predetermined condition, the predetermined condition is a condition that a gas temperature at an outlet portion of the compressor is higher than a predetermined temperature and the recirculating of exhaust gas is performed by the exhaust gas recirculation unit. The electronic control unit is configured to set a higher degree of cooling of the turbine when the predetermined condition is satisfied compared to a degree of cooling of the turbine when the predetermined condition is not satisfied.

In the controller, when exhaust gas (EGR gas) is introduced into the upstream portion of the compressor in the intake gas passage in a state where the gas temperature of the outlet portion of the compressor in the intake gas passage is high, deposition of deposits in the compressor may easily occur in some cases.

According to the controller, the higher degree of cooling of the turbine by the cooling unit can be set in the above-mentioned state. Accordingly, since the temperature of the turbine can be lowered and thus the temperature of the exhaust gas passing through the turbine can be lowered, it is possible to lower the temperature of the EGR gas returned from the downstream portion of the turbine in the exhaust gas passage to the upstream portion of the compressor in the intake gas passage. Therefore, it is possible to suppress a rise in gas temperature in the compressor and to suppress the deposition of deposits in the compressor.

In the controller, the electronic control unit may be configured calculate the gas temperature based on a set degree of cooling of the turbine, and the electronic control unit may be configured to set the higher degree of cooling of the turbine when the calculated gas temperature becomes higher. The set degree of cooling of the turbine is a value set on the assumption that the degree of cooling is constant.

In the controller, in order to suppress the actual gas temperature of the outlet portion to be equal to or less than a threshold temperature (temperature at which the deposition of deposits is appropriately suppressed), it is necessary to set the degree of cooling of the turbine by the cooling unit to be higher when the calculated gas temperature of the outlet portion becomes higher. The calculated gas temperature is calculated based on the set degree of cooling. According to the controller, since the higher degree of cooling of the turbine by the cooling unit can be set under this necessity, it is possible to appropriately suppress a rise in gas temperature in the compressor by efficiently cooling the turbine.

In the controller, the electronic control unit may be configured to set the higher degree of cooling of the turbine by the cooling unit as an amount of exhaust gas recirculated to the upstream portion of the compressor in the intake gas passage becomes larger. According to the controller, since the amount of EGR gas introduced into the upstream portion of the compressor in the intake gas passage is large, the higher degree of cooling of the turbine can be set as the gas temperature in the compressor becomes higher. Therefore, it is possible to appropriately suppress a rise in gas temperature in the compressor by efficiently cooling the turbine.

In the controller, the electronic control unit may be configured to set the higher degree of cooling of the turbine by the cooling unit by increasing an amount of coolant passing through the coolant passage per unit time. When the controller is applied to an engine system including a water pump, it is possible to simply achieve change in the degree of cooling of the turbine or suppression of the deposition of deposits using an existing water pump.

According to a second aspect of the invention, an engine system includes: an internal combustion engine; an exhaust-driven turbocharger including a compressor and a turbine, the compressor disposed in an intake gas passage of an internal combustion engine and the turbine disposed in an exhaust gas passage of the internal combustion engine; an exhaust gas recirculation unit configured to recirculate exhaust gas from a downstream portion of the turbine in the exhaust gas passage to an upstream portion of the compressor in the intake gas passage; a cooling unit configured to cool the turbine by circulating a coolant in a coolant passage disposed in the turbine; and an electronic control unit. The electronic control unit is configured to set a degree of cooling of the turbine based on a predetermined condition, the predetermined condition is a condition that a gas temperature at an outlet portion of the compressor is higher than a predetermined temperature and the recirculating of exhaust gas is performed by the exhaust gas recirculation unit. The electronic control unit is configured to set a higher degree of cooling of the turbine by the cooling unit when the predetermined condition is satisfied compared to a degree of cooling of the turbine when the predetermined condition is not satisfied.

According to a third aspect of the invention, a control method for an engine system that includes an exhaust-driven turbocharger including a compressor and a turbine, the compressor disposed in an intake gas passage of an internal combustion engine and the turbine disposed in an exhaust gas passage of the internal combustion engine, an exhaust gas recirculation unit configured to recirculate exhaust gas from an downstream portion of the turbine in the exhaust gas passage to an upstream portion of the compressor in the intake gas passage, and a cooling unit configured to cool the turbine by circulating a coolant in a coolant passage disposed in the turbine, the control method including: setting a degree of cooling of the turbine by the cooling unit based on a predetermined condition, the predetermined condition is a condition that a gas temperature at an outlet portion of the compressor is higher than a predetermined temperature and the recirculating of exhaust gas is performed by the exhaust gas recirculation unit, and setting a higher degree of cooling of the turbine by the cooling unit when the predetermined condition is satisfied compared to a degree of cooling of the turbine when the predetermined condition is not satisfied.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
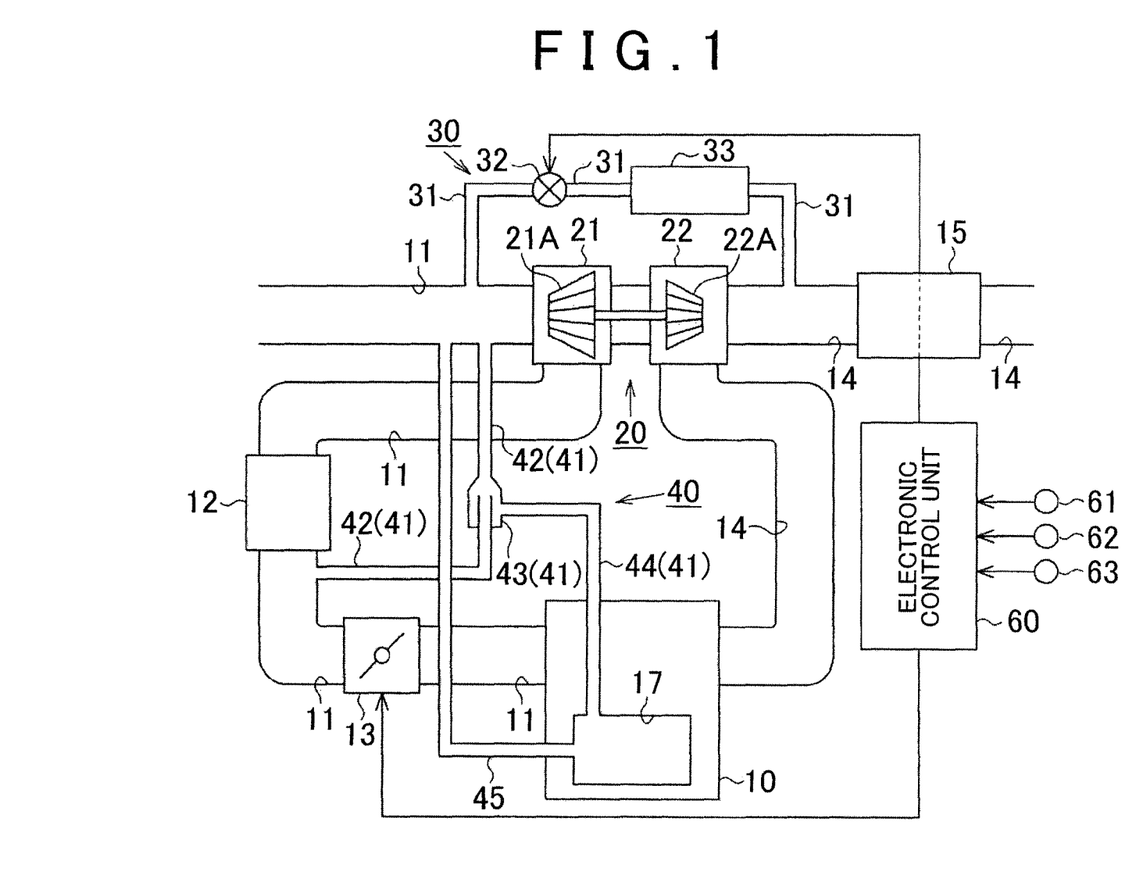
FIG. 1 is a diagram schematically illustrating a configuration of a controller for an engine system according to an embodiment of the invention.

Hereinafter, a controller for an engine system according to an embodiment of the invention will be described below. As illustrated in FIG. 1, an intake gas passage 11 of an internal combustion engine 10 is provided with a compressor 21 of a turbocharger 20, an intercooler 12, and an intake gas throttle valve 13 sequentially from the upstream side. The intercooler 12 cools intake gas. The intake gas throttle valve 13 changes the passage cross-sectional area of the intake gas passage 11. An exhaust gas passage 14 of the internal combustion engine 10 is provided with a turbine 22 of the turbocharger 20 and an exhaust gas controller 15 purifying exhaust gas sequentially from the upstream side. In the turbocharger 20, a compressor wheel 21A disposed in the compressor 21 and a turbine wheel 22A disposed in the turbine 22 are connected to each other.

The internal combustion engine 10 is provided with an EGR unit 30. The EGR unit 30 is configure to return a part of the exhaust gas in the exhaust gas passage 14 as exhaust gas recirculation (EGR) gas to the intake gas passage 11. The EGR unit 30 includes an EGR passage 31 communicating with the exhaust gas passage 14 and the intake gas passage 11 as a passage for recirculating the EGR gas. The exhaust gas passage 14 side of the EGR passage 31 is a downstream portion of the turbine 22 in the exhaust gas passage 14 and is connected to an upstream portion of an exhaust gas controller 15. On the other hand, the intake gas passage 11 side of the EGR passage 31 is connected to an upstream portion of the compressor 21 in the intake gas passage 11. The EGR passage 31 is provided with an EGR valve 32 for adjusting the amount of EGR gas passing through the EGR passage 31 and an EGR cooler 33 for cooling the EGR gas. By the operation control of the EGR valve 32, the amount of EGR gas passing through the EGR passage 31, that is, an EGR volume by the EGR unit 30 is adjusted.

The internal combustion engine 10 is provided with a blow-by gas processing unit 40 for discharging and processing combustion gas leaking into a crank case 17, that is, blow-by gas, into the intake gas. The blow-by gas processing unit 40 includes a breather passage 41 for discharging the blow-by gas from the inside of the crank case 17 to the intake gas passage 11. The breather passage 41 includes a driving gas passage 42, an ejector 43, and a gas introduction passage 44. The driving gas passage 42 extends in a shape for communicating with the upstream portion of the compressor 21 in the intake gas passage 11 and the downstream portion (specifically, between the intercooler 12 and the intake gas throttle valve 13) so as to bypass the compressor 21. The ejector 43 is disposed in the middle of the driving gas passage 42 and has a structure in which intake air supplied via the driving gas passage 42 passes through the inside of the ejector 43. The gas introduction passage 44 extends in a shape causing the inside of the ejector 43 and the inside of the crank case 17 to communicate with each other.

In the blow-by gas processing unit 40, air supplied via the driving gas passage 42 passes through the inside of the ejector 43 at the time of operating the internal combustion engine 10. At this time, gas including the blow-by gas in the crank case 17 is introduced into the inside of the ejector 43 via the gas introduction passage 44 using the force of the air flowing in the ejector 43. The introduced gas is sent to the intake gas passage 11 via the driving gas passage 42 along with the air.

The blow-by gas processing unit 40 includes a gas passage 45 extending in a shape allowing the upstream portion of the compressor 21 in the intake gas passage 11 and the inside of the crank case 17 to communicate with each other. When the pressure in the crank case 17 is low, air is introduced from the intake gas passage 11 into the crank case 17 via the gas passage 45. On the other hand, when the pressure in the crank case 17 is high, gas in the crank case 17 is discharged to the intake gas passage 11 via the gas passage 45.

Figure 2:
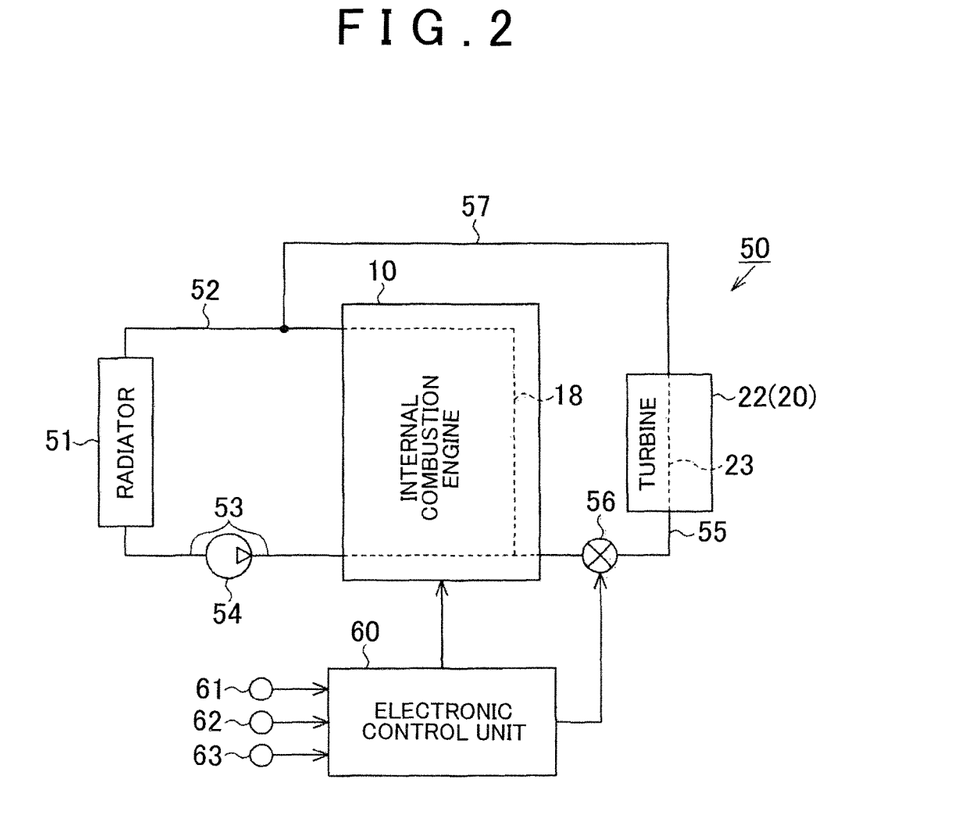
FIG. 2 is a diagram schematically illustrating a circuit configuration of a cooling system of the engine system according to the embodiment.

As illustrated in FIG. 2, the engine system is provided with a cooling system 50 for cooling the internal combustion engine 10 or the turbine 22 of the turbocharger 20. The cooling system 50 includes a water jacket 18 formed in the internal combustion engine 10 and a radiator 51 as a heat exchanger. The cooling system 50 includes an engine coolant passage 52 for guiding a coolant flowing out of the water jacket 18 to the radiator 51 and an engine coolant passage 53 for returning the coolant flowing out of the radiator 51 to the water jacket 18. The cooling system 50 is also provided with a water pump 54 for feeding the coolant therein.

A turbine water passage 23 (a coolant passage of the invention) is formed in the turbine 22 of the turbocharger 20. A coolant supply passage 55 branched and extending from the water jacket 18 is connected to the turbine water passage 23. The coolant in the water jacket 18 is supplied to the turbine water passage 23 via the coolant supply passage 55. The coolant supply passage 55 is provided with a control valve 56 for adjusting the amount of coolant passing through the coolant supply passage 55. The turbine water passage 23 is connected to a coolant discharge passage 57 merging with the engine coolant passage 52. The coolant passing through the turbine water passage 23 is returned to the engine coolant passage 52 via the coolant discharge passage 57.

In the cooling system 50, a coolant is circulated therein by the operation of the water pump 54. Accordingly, since the coolant lowered in temperature by passing through the radiator 51 passes through the water jacket 18 and the turbine water passage 23. Then, the internal combustion engine 10 or the turbine 22 is cooled by heat exchange with the coolant passing therethrough. The cooling system 50 has a structure capable of changing the degree of cooling of the turbine 22 by the cooling system 50 through the operation of the control valve 56. Specifically, the larger the opening of the control valve 56 becomes, the larger the amount of coolant flowing from the water jacket 18 to the turbine water passage 23 via the coolant supply passage 55 per unit time becomes and thus the higher the degree of cooling of the turbine 22 becomes.

As illustrated in FIG. 1, the engine system is provided with various sensors for detecting the operation state of the engine system. Examples of the sensors include a speed sensor 61, an opening sensor 62 of the intake gas throttle valve 13, and an opening sensor 63 of the EGR valve 32. The speed sensor 61 detects a rotation speed (engine rotation speed NE) of an output shaft (not illustrated) of the internal combustion engine 10. The opening sensor 62 detects an opening (throttle valve opening TA) of the intake gas throttle valve 13. The opening sensor 63 detects an opening (EGR opening TE) of the EGR valve 32.

The internal combustion engine 10 is provided with an electronic control unit 60 including, for example, a microcomputer as a peripheral. The electronic control unit 60 receives output signals from the sensors, performs various calculations on the basis of the output signals, and performs a variety of control on the operation of the internal combustion engine 10, such as the operation control of a fuel injection valve (not illustrated), the intake gas throttle valve 13, the EGR valve 32, the control valve 56, and the like on the basis of the calculation results.

In this embodiment, operation control of the EGR valve 32 and operation control of the intake gas throttle valve 13 are performed as EGR control for adjusting the EGR volume by the EGR unit 30. In the EGR control, first, a target control value (target throttle valve opening Tta) for the opening of the intake gas throttle valve 13 and a target control value (target EGR opening Tte) for the opening of the EGR valve 32 are calculated on the basis of an amount of fuel injected into the internal combustion engine 10 and the engine rotation speed NE by the electronic control unit 60. In this embodiment, relationships between an engine operation state in which a decrease in power consumption or suppression of degradation in exhaust properties of the internal combustion engine 10 can be achieved and the target control values are calculated in advance on the basis of results of experiment or simulation and are stored in the electronic control unit 60. The target control values are calculated on the basis of the engine operation state from the relationships. The operation of the EGR valve 32 is controlled so that the target EGR opening Tte and the actual EGR opening TE are equal to each other, and the operation of the intake gas throttle valve 13 is controlled so that the target throttle valve opening Tta and the actual throttle valve opening TA are equal to each other. In this embodiment, basically, in an engine operation area (specifically, an operation area in which an amount of fuel injected is large and the engine rotation speed NE is high) in which supercharging is performed by the turbocharger 20, the EGR valve 32 is opened and recirculation of the EGR gas to the intake gas passage 11 by the EGR unit 30 is performed.

In this embodiment, the exhaust gas (EGR gas) of the internal combustion engine 10 is returned to the upstream portion of the compressor 21 in the intake gas passage 11 by the EGR unit 30. The EGR gas is cooled by the EGR cooler 33, but is higher in temperature than the intake air. Accordingly, in the engine system according to this embodiment, the gas temperature in the compressor 21 is likely to be higher than that in an engine system not provided with the EGR unit 30. Accordingly, deposition of deposits, which are produced by exposure of an oil component and the like included in the EGR gas to a high temperature, on the compressor 21 may be caused. Specifically, when the gas temperature of the compressor 21 rises to a high-temperature state (for example, about 150° C. to 200° C.), the oil component in the gas is evaporated. The evaporated oil component may be attached to the inner surface of the compressor 21 as deposits.

In this embodiment, blow-by gas is introduced to the upstream portion of the compressor 21 in the intake gas passage 11 by the blow-by gas processing unit 40. The blow-by gas includes an oil component. Accordingly, in the engine system according to this embodiment, the oil component serves as a reason of the deposits and the deposition of deposits in the compressor 21 may occur.

Since the deposition of deposits changes the state of the inner surface of the compressor 21 (for example, a portion into which high-temperature and high-pressure air flows just after passing through the compressor wheel 21A: diffuser), degradation in the compressibility of the intake air by the compressor 21 and the supercharging efficiency of the turbocharger 20 may be caused.

Therefore, in this embodiment, when the gas temperature of the outlet portion of the compressor 21 in the intake gas passage 11 is higher than a predetermined temperature and the EGR gas is recirculated by the EGR unit 30, the opening of the control valve 56 is set to be larger unlike in the otherwise case. That is, when a predetermined condition in which the gas temperature of the outlet portion of the compressor 21 is higher than the predetermined temperature and the EGR gas is recirculated by the EGR unit 30 is satisfied, the opening of the control valve 56 is set to be larger compared to an opening of the control valve 56 when the predetermined condition is not satisfied.

Operations based on the change in the opening of the control valve 56 will be described below. When the EGR gas is introduced into the upstream portion of the compressor 21 in the intake gas passage 11 in the state where the gas temperature of the outlet portion of the compressor 21 is high, the deposition of deposits in the compressor 21 may be caused.

In this embodiment, since the opening of the control valve 56 is set to be larger in such a state, the amount of coolant passing through the turbine water passage 23 per unit time increases and the degree of cooling of the turbine 22 by the cooling system 50 becomes higher. Accordingly, since the temperature of the turbine 22 falls and the temperature of the exhaust gas passing through the turbine 22 also falls, it is possible to lower the temperature of the EGR gas that is returned from the downstream portion of the turbine 22 in the exhaust gas passage 14 to the upstream portion of the compressor 21 in the intake gas passage 11. As a result, it is possible to suppress the rise in the gas temperature in the compressor 21 and thus to suppress the deposition of deposits in the compressor 21.

At this time, since the temperature of the EGR gas falls, it is possible to increase the amount of the EGR gas passing through the EGR passage 31 and thus to achieve a decrease in pumping loss or an improvement in knock of the internal combustion engine 10.

When there is an engine operation area (specific area) in which there is a high possibility that the deposition of deposits in the compressor 21 will occur, it is necessary to construct a control structure of engine control in advance so that the engine operation state is not in the specific area, in order to suppress a decrease in durability of the engine system due to the deposition of deposits. In this case, when the specific area is narrowed, the area in which the internal combustion engine 10 can be operated is enlarged and thus the output power of the internal combustion engine 10 is improved. In this embodiment, in such an engine system, since the specific area can be narrowed by increasing the degree of cooling of the turbine by the cooling system 50, it is possible to enlarge the area in which the internal combustion engine 10 can be operated and thus to achieve an improvement in output power of the internal combustion engine 10.

The following method can be considered as the method of lowering the gas temperature in the compressor 21. That is, an air bypass passage causing the upstream portion and the downstream portion of the compressor 21 in the intake gas passage 11 to communicate with each other is provided and a switching valve is also provided in the air bypass passage. When the gas temperature is high, the switching valve is opened to return high-pressure intake gas from the downstream portion of the compressor 21 in the intake gas passage 11 to the upstream portion thereof via the air bypass passage. By employing this method, it is possible to lower the gas temperature in the compressor 21. However, on the other hand, since degradation in the supercharging performance of the turbocharger 20 is caused, there is a possibility that the output power of the internal combustion engine 10 will be lowered. In this embodiment, it is possible to lower the gas temperature in the compressor 21 without causing the degradation in the output power of the internal combustion engine 10.

Here, the gas temperature of the outlet portion of the compressor 21, which is calculated based on a set degree of cooling of the turbine 22 by the cooling system 50. The set degree of the cooling is a value on the assumption that the degree of cooling is constant. This degree of cooling is referred to as a "virtual gas temperature". Specifically, in this embodiment, the virtual gas temperature is a gas temperature of the outlet portion of the compressor 21 when control (normal control) of setting the opening of the control valve 56 to a predetermined opening is performed without performing the control (strong cooling control) of increasing the opening of the control valve 56 in order to lower the gas temperature in the compressor 21. The higher the virtual gas temperature becomes, it is necessary to set the opening of the control valve 56 to be larger and to set the degree of cooling of the turbine 22 by the cooling system 50 to be higher in order to suppress the gas temperature of the outlet portion of the compressor 21 to be equal to or lower than a threshold temperature (specifically, the upper limit of a temperature range in which the deposition of deposits is appropriately suppressed).

Under the condition in which the amount of gas (gas including air, EGR gas, and blow-by gas) passing through the compressor 21 is constant, the larger the EGR volume becomes, the larger the total amount of heat of the EGR gas introduced into the intake gas passage 11 per unit time becomes. Thus, the gas temperature in the compressor 21 tends to become higher temperature. Accordingly, by setting the opening of the control valve 56 to be larger and setting the degree of cooling of the turbine by the cooling system 50 to be higher as the EGR volume becomes larger, it is possible to appropriately suppress the rise in gas temperature in the compressor 21.

On the basis of this fact, in this embodiment, when the opening of the control valve 56 is set to be larger in order to set the degree of cooling of the turbine 22 by the cooling system 50 to be higher by performing the strong cooling control, the opening of the control valve 56 is set depending on the virtual gas temperature or the opening of the EGR valve 32 without simply enlarging the opening of the control valve 56.

Specifically, the higher the virtual gas temperature becomes, the larger the opening of the control valve 56 becomes. Accordingly, since the degree of cooling of the turbine 22 by the cooling system 50 can be set to be higher as described above, it is possible to efficiently cool the turbine 22 and thus to appropriately suppress the rise in gas temperature in the compressor 21.

In this embodiment, the larger the EGR opening TE becomes, the larger the opening of the control valve 56 becomes. Accordingly, the larger the EGR volume becomes and the higher the gas temperature in the compressor 21 becomes, the higher the degree of cooling of the turbine 22 by the cooling system 50 can be set to be. Accordingly, it is possible to appropriately suppress the rise in gas temperature in the compressor 21.

Figure 3:
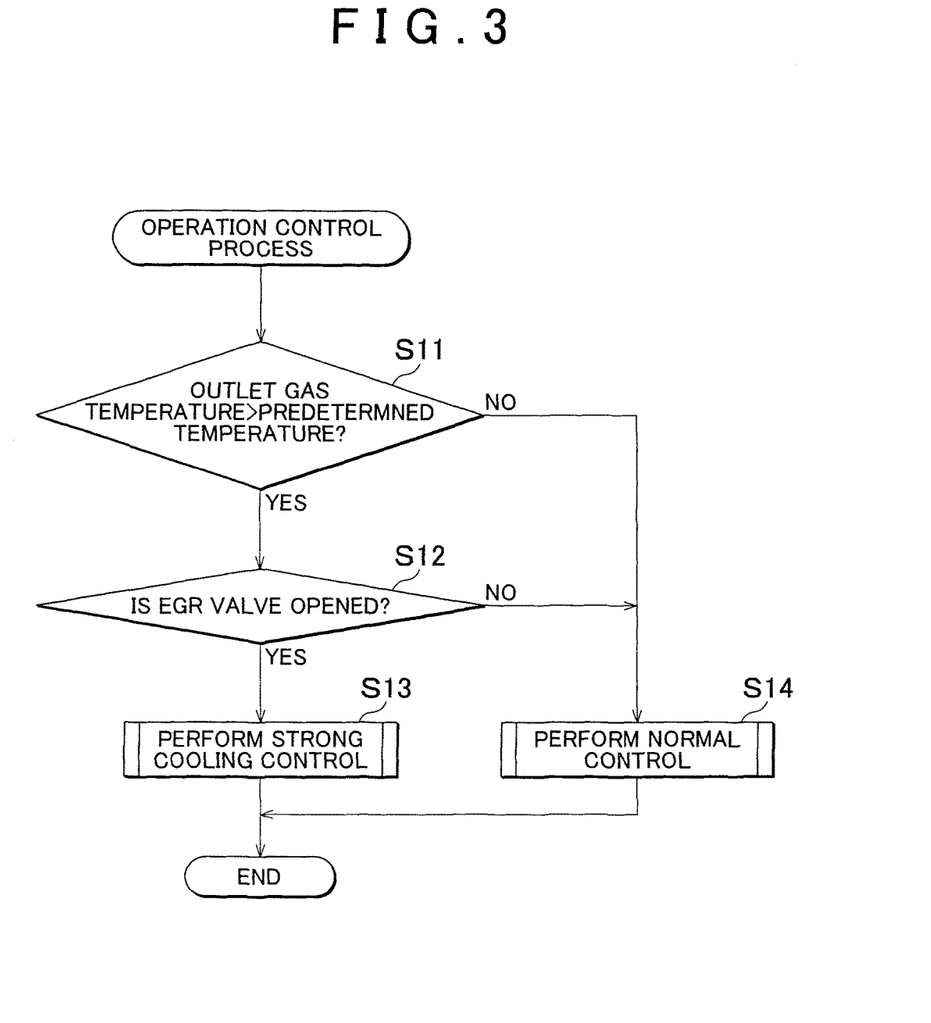
FIG. 3 is a flowchart illustrating a process flow of an operation control process according to the embodiment.

The process flow of the process relevant to the operation control (operation control process) of the control valve 56 will be described below in detail. FIG. 3 illustrates a specific process flow of the operation control process. A series of processes illustrated in the flowchart of FIG. 3 is performed with a predetermined cycle by the electronic control unit 60.

As illustrated in FIG. 3, in this process flow, it is first determined whether the gas temperature of the outlet portion (outlet gas temperature) of the compressor 21 is higher than a predetermined temperature (step S11). In this embodiment, the outlet gas temperature is a gas temperature in the vicinity of a connecting portion between the downstream portion of the compressor 21 in the intake gas passage 11 and the compressor 21. The outlet gas temperature is calculated on the basis of the amount of fuel injected and the engine rotation speed NE of the internal combustion engine 10 at that time through the use of a particular process which is periodically performed by the electronic control unit 60. The predetermined temperature is a temperature at which it can be surely determined whether there is a possibility that the gas temperature in the compressor 21 will become higher than the threshold temperature (for example, 150° C.). The predetermined temperature is calculated in advance on the basis of results of a variety of experiment or simulation and is stored in the electronic control unit 60.

When it is determined that the outlet gas temperature is higher than the predetermined temperature (YES in step S11), it is determined whether the EGR valve 32 is opened (step S12). When it is determined that the EGR valve 32 is opened (YES in step S12), it is determined that the EGR gas is recirculated to the intake gas passage 11 by the EGR unit 30 and the strong cooling control is performed (step S13).

The strong cooling control is performed as follows. That is, the virtual gas temperature is calculated on the amount of fuel injected and the engine rotation speed NE of the internal combustion engine 10. In this embodiment, a relationship between the engine operation area determined depending on the amount of fuel injected and the engine rotation speed NE and the virtual gas temperature is calculated in advance on the basis of results of a variety of experiment or simulation and is stored in the electronic control unit 60. In the strong cooling control, the virtual gas temperature is calculated on the basis of the relationship.

The target control value (target water passage opening) of the control valve 56 is calculated on the basis of the virtual gas temperature and the EGR opening TE. In this embodiment, a relationship among the opening (target water passage opening) of the control valve 56, the virtual gas temperature, and the EGR opening TE, at which the turbine 22 can be cooled without excess and without deficiency in order to suppress the deposition of deposits in the compressor 21, is calculated in advance on the basis of results of a variety of experiment or simulation and is stored in the electronic control unit 60. In the strong cooling control, the target water passage opening is calculated on the basis of the relationship. Specifically, the higher the virtual gas temperature becomes and the larger the EGR opening TE becomes, the larger the target water passage opening is calculated to be. Thereafter, the operation of the control valve 56 is controlled so that the target water passage opening and the actual opening of the control valve 56 are equal to each other.

On the other hand, when the outlet gas temperature is equal to or lower than a predetermined temperature (NO in step S11) or when the EGR valve 32 is closed (NO in step S12), the normal control instead of the strong cooling control is performed as the operation control of the control valve 56 (step S14).

In the normal control, the operation of the control valve 56 is controlled so that the opening of the control valve 56 is equal to a predetermined opening. The predetermined opening is an opening of the control valve 56 at which a flow rate of the coolant capable of suppressing an excessive increase in temperature of the turbine 22 is obtained. The predetermined opening is calculated in advance on the basis of results of a variety of experiment or simulation and is stored in the electronic control unit 60. In this embodiment, a certain opening smaller than the minimum opening in the opening range of the control valve 56 that is set at the time of performing the strong cooling control is set as the predetermined opening.

As described above, according to this embodiment, the following effects can be achieved. When the outlet gas temperature is higher than the predetermined temperature and the EGR valve 32 is opened, the opening of the control valve 56 is set to be larger compared to the opening of the control valve 56 in the otherwise case. Accordingly, it is possible to suppress the rise in gas temperature in the compressor 21 and to suppress the deposition of deposits in the compressor 21.

When the opening of the control valve 56 is set to be larger in order to increase the degree of cooling of the turbine 22 by the cooling system 50, the higher the virtual gas temperature becomes, the larger the opening of the control valve 56 is set to be. Accordingly, it is possible to appropriately suppress the rise in gas temperature in the compressor 21 by efficiently cooling the turbine 22.

When the opening of the control valve 56 is set to be larger in order to increase the degree of cooling of the turbine 22 by the cooling system 50, the higher the EGR opening TE becomes, the larger the opening of the control valve 56 is set to be. Accordingly, it is possible to appropriately suppress the rise in gas temperature in the compressor 21.

By enlarging the opening of the control valve 56 to increase the amount of coolant passing through the turbine water passage 23 per unit time, the degree of cooling of the turbine 22 by the cooling system 50 is set to be higher. Accordingly, when the fuel supply controller is applied to an engine system including a water pump, it is possible to simply achieve the change in the degree of cooling of the turbine 22 by the cooling system 50 or the suppression of the deposition of deposits in the compressor 21 using an existing water pump.

The above-mentioned embodiment may be modified as follows. Instead of using the temperature calculated on the basis of the amount of fuel injected and the engine rotation speed NE of the internal combustion engine 10, a temperature detected by a temperature sensor disposed in the outlet portion of the compressor 21 may be used as the outlet gas temperature.

In the above-mentioned embodiment, the gas temperature in the vicinity of the connecting portion between the downstream portion of the compressor 21 in the intake gas passage 11 and the compressor 21 is employed as the outlet gas temperature. The gas temperature of an arbitrary portion on the downstream side of the compressor wheel 21A, such as the gas temperature in a diffuser of the compressor 21, may be employed as the outlet gas temperature. A temperature as an index of the gas temperature of any portion in which the deposition of deposits in the compressor 21 can be employed as the outlet gas temperature.

In the process of step S12 of the operation control process (FIG. 3), instead of determining whether the EGR valve 32 is opened, it may be determined whether the engine operation area determined depending on the amount of fuel injected and the engine rotation speed NE is an operation area in which the recirculation of the EGR gas to the intake gas passage 11 is performed by the EGR unit 30. In the process of step S12, it only has to be determined whether the recirculation of the EGR gas to the intake gas passage 11 is performed by the EGR unit 30.

In the above-mentioned embodiment, the gas temperature of the outlet portion of the compressor 21 predicted when the opening of the control valve 56 is set to the predetermined opening (opening set at the time of performing the normal control) is defined as the virtual gas temperature. The invention is not limited to this definition, but the gas temperature of the outlet portion of the compressor 21 predicted when the opening of the control valve 56 is set to a certain opening may be defined as the virtual gas temperature. The gas temperature of the outlet portion of the compressor 21 calculated based on the set degree of cooling of the turbine 22 by the cooling system 50. The set degree of cooling is a value on the assumption that the degree of cooling is constant, and the set degree of cooling can be employed as the virtual gas temperature.

Instead of or in addition to using the virtual gas temperature as a parameter for calculating the target water passage opening, the outlet gas temperature may be used. In the controller, the higher the outlet gas temperature becomes, the larger the opening of the control valve 56 can become and the higher the degree of cooling of the turbine 22 by the cooling system 50 can become. According to the controller, it is possible to adjust the opening of the control valve 56 depending on the gas temperature of the outlet portion of the compressor 21 at every time and to appropriately suppress the rise in gas temperature in the compressor 21 by efficiently cooling the turbine 22.

In the strong cooling control (the process of step S13 in FIG. 3), the target water passage opening may be calculated on the basis of the EGR opening TE without using the virtual gas temperature, or the target water passage opening may be calculated on the basis of the virtual gas temperature without the EGR opening TE.

The EGR volume by the EGR unit 30 or the temperature of the EGR gas may be used as the parameter for calculating the target water passage opening in the strong cooling control. The larger the EGR volume by the EGR unit 30 becomes and the higher the temperature of the EGR gas becomes, the larger the total amount of heat of the EGR gas recirculated to the intake gas passage 11 per unit time becomes and thus the gas temperature in the compressor 21 is likely to rise. Accordingly, by increasing the opening of the control valve 56 as the EGR volume becomes larger or increasing the opening of the control valve 56 as the temperature of the EGR gas becomes higher, it is possible to appropriately suppress the rise in gas temperature in the compressor 21. The EGR volume by the EGR unit 30 can be estimated on the basis of the operation state of the internal combustion engine 10 with high accuracy. The temperature of the EGR gas can be estimated on the basis of the operation state of the internal combustion engine 10, or may employ the detected temperature of the exhaust gas in the exhaust gas passage 14, or may be detected by a temperature sensor disposed in the EGR passage 31.

A component (an amount of oil component or an amount of soot) of the EGR gas may be used as the parameter for calculating the target water passage opening in the strong cooling control. In this case, for example, the larger the amount of oil component or the amount of soot included in the EGR gas becomes, the larger the opening of the control valve 56 can be set to be. In the engine system, the oil component or the soot included in the EGR gas serves as the basis of deposits. Accordingly, the larger the amount of oil component or the amount of soot in the EGR gas becomes, the more easily the deposition of deposits can be caused. From this point of view, in the strong cooling control, by setting the target water passage opening to be larger as the amount of oil component or the amount of soot included in the EGR gas becomes larger, it is possible to suppress the rise in gas temperature in the compressor 21 when there is a high possibility that the deposition of deposits or the increase in the amount of deposits deposited will be caused. Accordingly, it is possible to appropriately suppress the deposition of deposits in the compressor 21. The components of the EGR gas can be estimated on the basis of the operation state (the amount of fuel injected, the engine rotation speed NE, or the like) of the internal combustion engine 10.

In the strong cooling control, the opening of the control valve 56 may be changed to a certain opening larger than the opening of the control valve 56 in the normal control. With this configuration, when the gas temperature of the outlet portion of the compressor 21 is higher than the predetermined temperature and the recirculation of the EGR gas by the EGR unit 30 is performed, it is possible to set the degree of cooling of the turbine 22 by the cooling system 50 to be higher by increasing the opening of the control valve 56, unlike in the otherwise case.

The water pump 54 employs a pump capable of changing an amount of coolant circulated, such as a swashplate pump or an electric pump, and the amount of coolant circulated by the pump in the strong cooling control may be set to be larger than the amount of coolant circulated in the normal control. With this configuration, when the gas temperature of the outlet portion of the compressor 21 is higher than the predetermined temperature and the recirculation of the EGR gas by the EGR unit 30 is performed, it is possible to set the degree of cooling of the turbine 22 by the cooling system 50 by increasing the amount of coolant passing through the turbine water passage 23, unlike in the otherwise case. In this controller, the use of the control valve 56 may be skipped.

The coolant circuit of the cooling system of the engine system may be changed so that the temperature of the coolant flowing into the turbine water passage 23 in the strong cooling control is lower than the temperature of the coolant flowing into the turbine water passage 23 in the normal control. With this configuration, when the gas temperature of the outlet portion of the compressor 21 is higher than the predetermined temperature and the recirculation of the EGR gas by the EGR unit 30 is performed, it is possible to set the degree of cooling of the turbine 22 by the cooling system to be higher by lowering the temperature of the coolant passing through the turbine water passage 23, unlike in the otherwise case.

Figure 4:
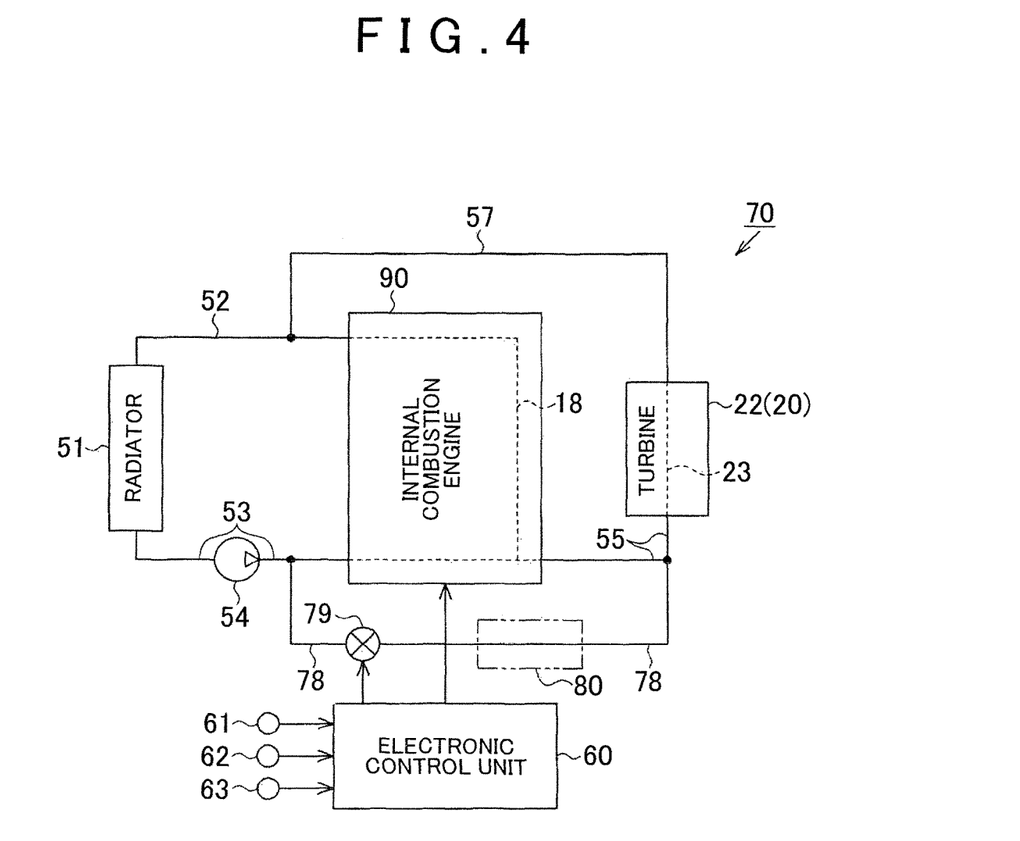
FIG. 4 is a diagram schematically illustrating a circuit configuration of a cooling system according to another embodiment of the invention.

FIG. 4 illustrates an example of a cooling system 70 capable of implementing this configuration. As illustrated in FIG. 4, the cooling system 70 includes a bypass water passage 78 branched from the engine coolant passage 53 and merging with the coolant supply passage 55 so as to bypass the water jacket 18. The bypass water passage 78 is provided with a switching valve 79. The cooling system 70 is not provided with the control valve 56 (see FIG. 2).

The coolant circuit of the cooling system 70 can be changed as follows. That is, the switching valve 79 is closed in the normal control. Accordingly, the coolant circuit of the cooling system 70 is switched to a state where the low-temperature coolant flowing out of the radiator 51 passes through the water jacket 18 and then flows into the turbine water passage 23. On the other hand, the switching valve 79 is opened in the strong cooling control. Accordingly, the low-temperature coolant flowing out of the radiator 51 bypasses the water jacket 18 and flows into the turbine water passage 23.

As indicated by a one-dot chain line in FIG. 4, the bypass water passage 78 may be provided with a cooler 80. According to this cooling system 70, when the coolant flows into the turbine water passage 23 via the bypass water passage 78 at the time of performing the strong cooling control, it is possible to cool the coolant to a low temperature by the use of the cooler 80 and to appropriately set the degree of cooling of the turbine 22 by the cooling system 70 to be high.

The controller according to the above-mentioned embodiment can be applied to an engine system not provided with the EGR cooler 33. The controller according to this embodiment can be applied to an engine system not provided with the blow-by gas processing unit 40, as long as it is an engine system in which there is a possibility that deposits will be deposited in the compressor 21 due to the oil component included in the EGR gas.

What is claimed is:

1. A controller for an engine system, the engine system including:
    an exhaust-driven turbocharger including a compressor and a turbine, the compressor disposed in an intake gas passage of an internal combustion engine and the turbine disposed in an exhaust gas passage of the internal combustion engine;
    an exhaust gas recirculation unit that includes an exhaust gas recirculation passage that communicates with the exhaust gas passage and the intake gas passage, the exhaust gas recirculation unit being configured to recirculate exhaust gas from a downstream portion of the turbine in the exhaust gas passage to an upstream portion of the compressor in the intake gas passage;
    a cooling system that includes a radiator and a water pump configured to cool the turbine by circulating a coolant in a coolant passage disposed in the turbine;
    the controller comprising an electronic control unit including executable instructions stored in a non-transitory computer readable medium to
        set a degree of cooling of the turbine by the cooling system based on a predetermined condition, the predetermined condition being a condition that a detected gas temperature at an outlet portion of the compressor is higher than a predetermined temperature and a recirculating of exhaust gas is performed by the exhaust gas recirculation unit; and
        set a higher degree of cooling of the turbine when the predetermined condition is satisfied compared to a degree of cooling of the turbine when the predetermined condition is not satisfied.

2. The controller according to claim 1, wherein the electronic control unit further comprises the executable instructions to increase a degree of cooling of the turbine by the cooling system as an amount of exhaust gas recirculated to the upstream portion of the compressor in the intake gas passage increases.

3. The controller according to claim 1, wherein the electronic control unit further comprises the executable instructions to increase a degree of cooling of the turbine by the cooling system by increasing an amount of coolant passing through the coolant passage per unit time.

4. An engine system comprising:
    an internal combustion engine;
    an exhaust-driven turbocharger including a compressor and a turbine, the compressor disposed in an intake gas passage of the internal combustion engine and the turbine disposed in an exhaust gas passage of the internal combustion engine;
    an exhaust gas recirculation unit that includes an exhaust gas recirculation passage that communicates with the exhaust gas passage and the intake gas passage, the exhaust gas recirculation unit being configured to recirculate exhaust gas from a downstream portion of the turbine in the exhaust gas passage to an upstream portion of the compressor in the intake gas passage;
    a cooling system that includes a radiator and a water pump configured to cool the turbine by circulating a coolant in a coolant passage disposed in the turbine; and
    an electronic control unit including a non-transitory computer readable medium to execute of:
        setting a degree of cooling of the turbine based on a predetermined condition, the predetermined condition being a condition that a detected gas temperature at an outlet portion of the compressor is higher than a predetermined temperature and a recirculating of exhaust gas is performed by the exhaust gas recirculation unit; and
        setting a higher degree of cooling of the turbine when the predetermined condition is satisfied compared to a degree of cooling of the turbine when the predetermined condition is not satisfied.

5. A control method for an engine system, the engine system including an exhaust-driven turbocharger including a compressor and a turbine, the compressor disposed in an intake gas passage of an internal combustion engine and the turbine disposed in an exhaust gas passage of the internal combustion engine, an exhaust gas recirculation unit that includes an exhaust gas recirculation passage that communicates with the exhaust gas passage and the intake gas passage, the exhaust gas recirculation unit being configured to recirculate exhaust gas from a downstream portion of the turbine in the exhaust gas passage to an upstream portion of the compressor in the intake gas passage, a cooling system that includes a radiator and a water pump configured to cool the turbine by circulating a coolant in a coolant passage disposed in the turbine, and an electronic control unit, the control method comprising:
    setting, by the electronic control unit, a degree of cooling of the turbine based on a predetermined condition, the predetermined condition being a condition that a detected gas temperature at an outlet portion of the compressor is higher than a predetermined temperature and a recirculating of exhaust gas is performed by the exhaust gas recirculation unit; and
    setting a higher degree of cooling of the turbine when the predetermined condition is satisfied compared to a degree of cooling of the turbine when the predetermined condition is not satisfied.

* * * * *